United States Patent
Ichikawa et al.

(10) Patent No.: US 9,637,015 B2
(45) Date of Patent: May 2, 2017

(54) NON-CONTACT ELECTRIC POWER TRANSMISSION SYSTEM AND CHARGING STATION

(71) Applicant: TOYOTA JIDOSHA KABUSHIKI KAISHA, Toyota-shi, Aichi-ken (JP)

(72) Inventors: Shinji Ichikawa, Toyota (JP); Satoshi Taniguchi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 212 days.

(21) Appl. No.: 14/582,832

(22) Filed: Dec. 24, 2014

(65) Prior Publication Data

US 2015/0217649 A1    Aug. 6, 2015

(30) Foreign Application Priority Data

Jan. 31, 2014    (JP) ................ 2014-017141

(51) Int. Cl.
- *H02J 7/00*    (2006.01)
- *B60L 11/18*    (2006.01)
- *H02J 17/00*    (2006.01)

(52) U.S. Cl.
CPC ......... *B60L 11/182* (2013.01); *B60L 11/1829* (2013.01); *B60L 11/1833* (2013.01); *H02J 7/0027* (2013.01); *H02J 17/00* (2013.01); *Y02T 10/7005* (2013.01); *Y02T 10/7055* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ......................................... H02J 7/025
USPC ......................................... 320/108
See application file for complete search history.

(56) References Cited

U.S. PATENT DOCUMENTS

| 7,741,734 B2 | 6/2010 | Joannopoulos et al. |
| 2007/0222542 A1 | 9/2007 | Joannopoulos et al. |
| 2008/0278264 A1 | 11/2008 | Karalis et al. |
| 2009/0195332 A1 | 8/2009 | Joannopoulos et al. |

(Continued)

FOREIGN PATENT DOCUMENTS

| AU | 2006269374 B2 | 1/2007 |
| AU | 2006269374 C1 | 1/2007 |

(Continued)

*Primary Examiner* — Edward Tso
*Assistant Examiner* — Ahmed Omar
(74) *Attorney, Agent, or Firm* — Oliff PLC

(57) ABSTRACT

When a power supply ECU receives a signal requesting test electric power transmission, the power supply ECU has a plurality of electric power transmission portions start transmission of electric power for positioning, and determines an electric power transmission portion with which a vehicle is carrying out positioning based on which of a plurality of detection portions has detected effective electric power. The vehicle transmits a first signal to a charging station when positioning is completed. When the power supply ECU receives the first signal and it is determined that the vehicle has stopped at the electric power transmission portion which is the subject of electric power transmission, the power supply ECU has the electric power transmission portion which is the subject of electric power transmission transmit electric power higher than electric power for positioning.

4 Claims, 5 Drawing Sheets

(56) References Cited

U.S. PATENT DOCUMENTS

| | | |
|---|---|---|
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2011/0193520 A1* | 8/2011 | Yamazaki ............... B60L 5/005 320/108 |
| 2013/0038272 A1 | 2/2013 | Sagata |
| 2013/0113298 A1 | 5/2013 | Ryu et al. |
| 2013/0127409 A1 | 5/2013 | Ichikawa |
| 2013/0193749 A1 | 8/2013 | Nakamura et al. |
| 2014/0015328 A1* | 1/2014 | Beaver ................. B60L 11/182 307/104 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| EP | 2 216 870 A2 | 8/2010 |
| IN | 735/DELNP/2008 | 5/2008 |
| IN | 6195/DELNP/2009 | 7/2010 |
| JP | A-2009-501510 | 1/2009 |
| JP | A-2013-110822 | 6/2013 |
| JP | A-2013-126327 | 6/2013 |
| JP | A-2013-132170 | 7/2013 |
| JP | A-2013-135572 | 7/2013 |
| JP | A-2013-146148 | 7/2013 |
| JP | A-2013-146154 | 7/2013 |
| JP | A-2013-154815 | 8/2013 |
| JP | 2013-240130 A | 11/2013 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |
| WO | 2012/086048 A1 | 6/2012 |
| WO | WO 2013/108108 A2 | 7/2013 |

* cited by examiner

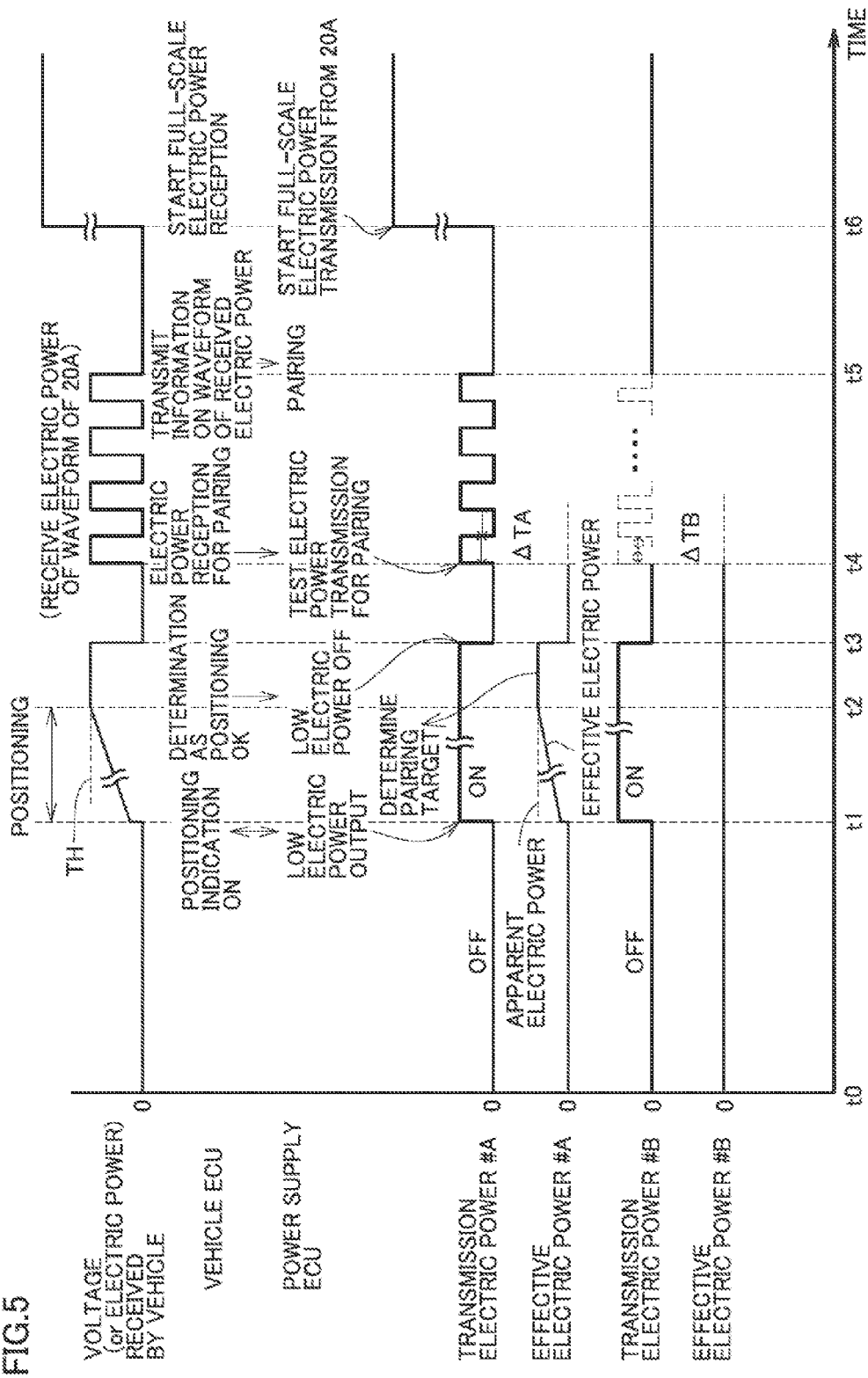

NON-CONTACT ELECTRIC POWER TRANSMISSION SYSTEM AND CHARGING STATION

This nonprovisional application is based on Japanese Patent Application No. 2014-017141 filed with the Japan Patent Office on Jan. 31, 2014, the entire contents of which are hereby incorporated by reference.

BACKGROUND OF THE INVENTION

Field of the Invention

The present invention relates to a non-contact electric power transmission system and a charging station.

Description of the Background Art

Japanese Patent Laying-Open No. 2013-135572 discloses a non-contact charging system in which electric power is transmitted from a vehicle to a charging station in a non-contact manner. In the non-contact charging system, positioning between an electric power transmission portion of the charging station and an electric power reception portion of the vehicle is carried out in order to enhance efficiency in electric power transmission and reception.

In the publication above, one control unit on an electric power transmission side is provided in a charging station and this control unit on the electric power transmission side controls one electric power transmission coil.

Such a type that one control unit controls a plurality of electric power transmission coils, however, is possible as a type of the charging station. In the charging station of such a type, the charging station cannot know over which electric power transmission coil a vehicle has stopped. If electric power is supplied to an electric power transmission coil in a parking frame where a vehicle is not parked, high reflected electric power is applied to the electric power transmission coil and damage of an electric power transmission device may be caused. Therefore, an electric power transmission coil where a vehicle is parked should be determined. Here, for example, a sensor for checking a position of a vehicle may be provided for each parking frame.

Provision of such a sensor for checking a position of a vehicle, however, increases cost and construction of the charging station also requires efforts.

SUMMARY OF THE INVENTION

An object of the present invention is to provide an electric power transmission system with a simplified configuration, which can determine an electric power transmission device at a position where a vehicle has stopped.

In summary, this invention is directed to a non-contact electric power transmission system including a vehicle and a charging station. The charging station includes a plurality of electric power transmission portions, a plurality of detection portions detecting effective electric power of transmission electric power transmitted from the plurality of electric power transmission portions, and an electric power transmission control unit controlling electric power transmission from the plurality of electric power transmission portions. Upon reception of a signal requesting test electric power transmission from the vehicle, the electric power transmission control unit has the plurality of electric power transmission portions start transmission of transmission electric power for positioning, and determines, based on which of the plurality of detection portions detects effective electric power, an electric power transmission portion which is transmitting electric power to the vehicle as a subject of electric power transmission. The vehicle transmits a first signal to the charging station when positioning with respect to the electric power transmission portion which is the subject of electric power transmission is completed. The electric power transmission control unit determines whether or not the vehicle has stopped at a position where the electric power transmission portion which is the subject of electric power transmission has been installed, upon reception of the first signal, and has the electric power transmission portion which is the subject of electric power transmission transmit electric power higher than the transmission electric power for positioning when it is determined that the vehicle has stopped at the electric power transmission portion which is the subject of electric power transmission.

With the configuration above, without providing a vehicle sensor in each electric power transmission portion of the charging station, whether or not a vehicle has stopped over each electric power transmission portion can be determined based on whether or not there is effective electric power in the electric power transmission portion.

Preferably, the electric power transmission control unit has the electric power transmission portion which is the subject of electric power transmission carry out electric power transmission which is set with a duration being differed for each of the plurality of electric power transmission portions, upon reception of the first signal. The vehicle transmits a second signal corresponding to the received duration to the charging station. The electric power transmission control unit determines based on the second signal, whether or not the vehicle has stopped at the electric power transmission portion which is the subject of electric power transmission.

With the configuration above, whether or not determination for determining a subject of electric power transmission which is made based on detection of effective electric power is correct can be checked before full-scale electric power transmission for charging.

Preferably, the electric power transmission control unit has the electric power transmission portion which is the subject of electric power transmission carry out electric power transmission which is set with the number of times of switching between on and off being differed for each of the plurality of electric power transmission portions, upon reception of the first signal, the vehicle transmits a third signal corresponding to the received number of times of switching to the charging station, and the electric power transmission control unit determines based on the third signal, whether or not the vehicle has stopped at the electric power transmission portion which is the subject of electric power transmission.

With the configuration above, whether or not determination for determining a subject of electric power transmission which is made based on detection of effective electric power is correct can be checked before full-scale electric power transmission for charging.

In another aspect, this invention is directed to a charging station which feeds electric power to a vehicle in a non-contact manner, and the charging station includes a plurality of electric power transmission portions, a plurality of detection portions detecting effective electric power of transmission electric power transmitted from the plurality of electric power transmission portions, and an electric power transmission control unit controlling electric power transmission from the plurality of electric power transmission portions. Upon reception of a signal requesting test electric power transmission from the vehicle, the electric power transmission control unit has the plurality of electric power transmission portions start transmission of transmission electric power for positioning, and determines, based on which of the plurality of detection portions detects effective electric power, an electric power transmission portion which is transmitting electric power to the vehicle as a subject of electric power transmission. The vehicle transmits a first signal to the charging station when positioning with respect to the electric power transmission portion which is the subject of electric power transmission is completed. The electric power transmission control unit determines whether or not the vehicle has stopped at a position where the electric power transmission portion which is the subject of electric power transmission has been installed, upon reception of the first signal, and has the electric power transmission portion which is the subject of electric power transmission transmit electric power higher than the transmission electric power for positioning when it is determined that the vehicle has stopped at the electric power transmission portion which is the subject of electric power transmission.

With the configuration above, without providing a vehicle sensor in each electric power transmission portion of the charging station, whether or not a vehicle has stopped over each electric power transmission portion can be determined based on whether or not there is effective electric power in the electric power transmission portion.

Preferably, the electric power transmission control unit has the electric power transmission portion which is the subject of electric power transmission carry out electric power transmission which is set with a duration being differed for each of the plurality of electric power transmission portions, upon reception of the first signal. The vehicle transmits a second signal corresponding to the received duration to the charging station. The electric power transmission control unit determines based on the second signal, whether or not the vehicle has stopped at the electric power transmission portion which is the subject of electric power transmission.

With the configuration above, whether or not determination for determining a subject of electric power transmission which is made based on detection of effective electric power is correct can be checked before full-scale electric power transmission for charging.

Preferably, the electric power transmission control unit has the electric power transmission portion which is the subject of electric power transmission carry out electric power transmission which is set with the number of times of switching between on and off being differed for each of the plurality of electric power transmission portions, upon reception of the first signal. The vehicle transmits a third signal corresponding to the received number of times of switching to the charging station, and the electric power transmission control unit determines based on the third signal, whether or not the vehicle has stopped at the electric power transmission portion which is the subject of electric power transmission.

With the configuration above, whether or not determination for determining a subject of electric power transmission which is made based on detection of effective electric power is correct can be checked before full-scale electric power transmission for charging.

According to the present invention, an electric power transmission system which can determine an electric power transmission device where a vehicle has stopped can be realized with a simplified configuration.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram for illustrating a modification of pairing processing.

DESCRIPTION OF THE PREFERRED EMBODIMENTS

Figure 1:
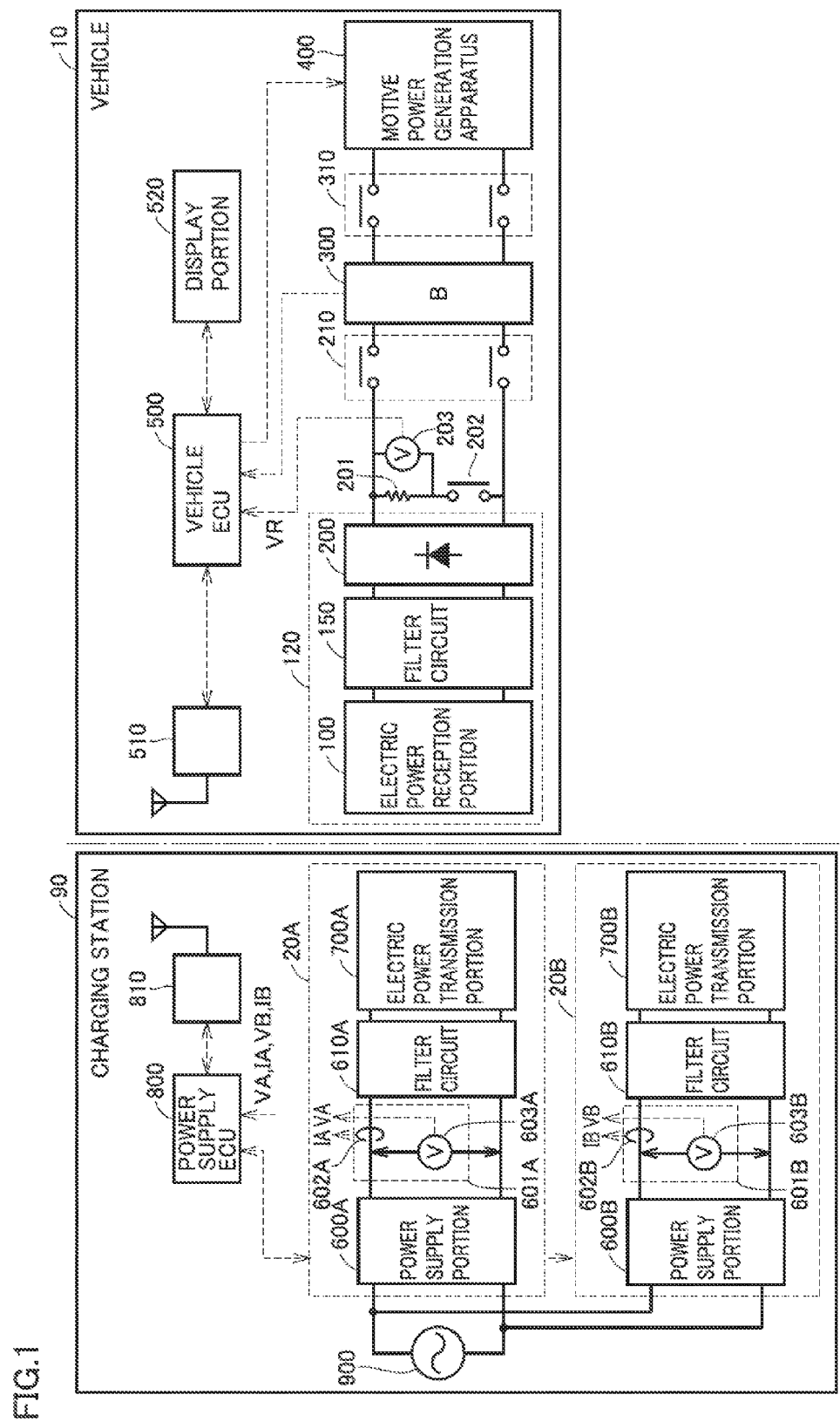
FIG. 1 is an overall configuration diagram of a non-contact electric power transmission system representing one example of an embodiment of the present invention.

An embodiment of the present invention will be described hereinafter in detail with reference to the drawings. The same or corresponding elements in the drawings have the same reference characters allotted and description thereof will not be repeated.

(Description of Overview of Non-Contact Electric Power Transmission System)

Figure 2:
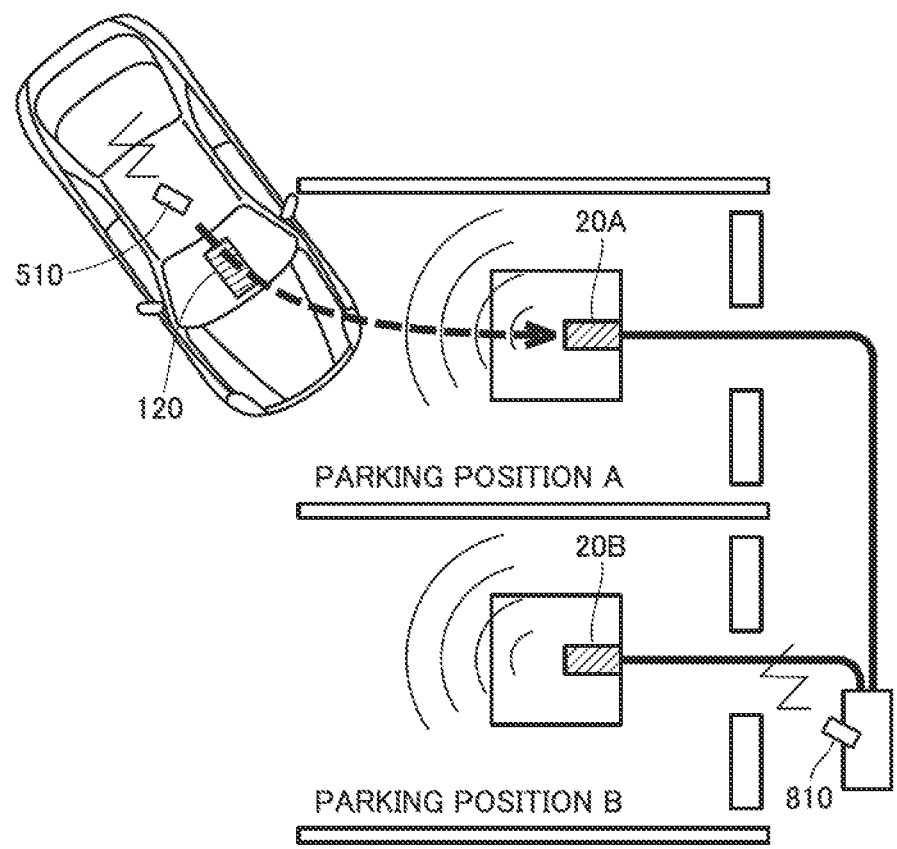
FIG. 2 is a diagram for illustrating parking of a vehicle at a parking position within a charging station.

FIG. 1 is an overall configuration diagram of a non-contact electric power transmission system representing one example of an embodiment of the present invention. FIG. 2 is a diagram for illustrating parking of a vehicle at a parking position within a charging station. Initially, overview of the present embodiment will be described with reference to FIGS. 1 and 2.

Referring to FIGS. 1 and 2, a non-contact electric power transmission system in the present embodiment includes a vehicle 10 and a charging station 90. Charging station 90 includes a plurality of electric power transmission portions 700A and 700B, a plurality of detection portions 601A and 601B detecting effective electric power of transmission electric power transmitted from the plurality of electric power transmission portions 700A and 700B, respectively, and an electric power transmission control unit (a power supply ECU 800) controlling electric power transmission from the plurality of electric power transmission portions 700A and 700B. When the electric power transmission control unit (power supply ECU 800) receives a signal requesting test electric power transmission from vehicle 10 (S540 in FIG. 3), it has the plurality of electric power transmission portions 700A and 700B start transmission of transmission electric power for positioning, and determines, based on which of the plurality of detection portions 601A and 601B detects effective electric power, an electric power transmission portion which is transmitting electric power to vehicle 10 as a subject of electric power transmission (S560 to S580B in FIG. 3). When positioning with respect to the electric power transmission portion which is the subject of electric power transmission is completed, vehicle 10 transmits a first signal to charging station 90 (S70 in FIG. 3 and a time t2 in FIG. 4). When the electric power transmission control unit (power supply ECU 800) receives the first signal, it determines whether or not vehicle 10 has stopped at the electric power transmission portion which is the subject of electric power transmission (pairing processing in S610 in FIG. 3), and when it is determined that vehicle 10 has stopped at a position where the electric power transmission portion which is the subject of electric power transmission is installed, the electric power transmission control unit has the electric power transmission portion which is the subject of electric power transmission transmit electric power higher than transmission electric power for positioning.

With the configuration above, without providing a vehicle sensor in each electric power transmission portion of charging station 90, whether or not vehicle 10 has stopped over each electric power transmission portion can be determined based on whether or not there is effective electric power in the electric power transmission portion. In addition, pairing processing can end in a short period of time.

Figure 4:
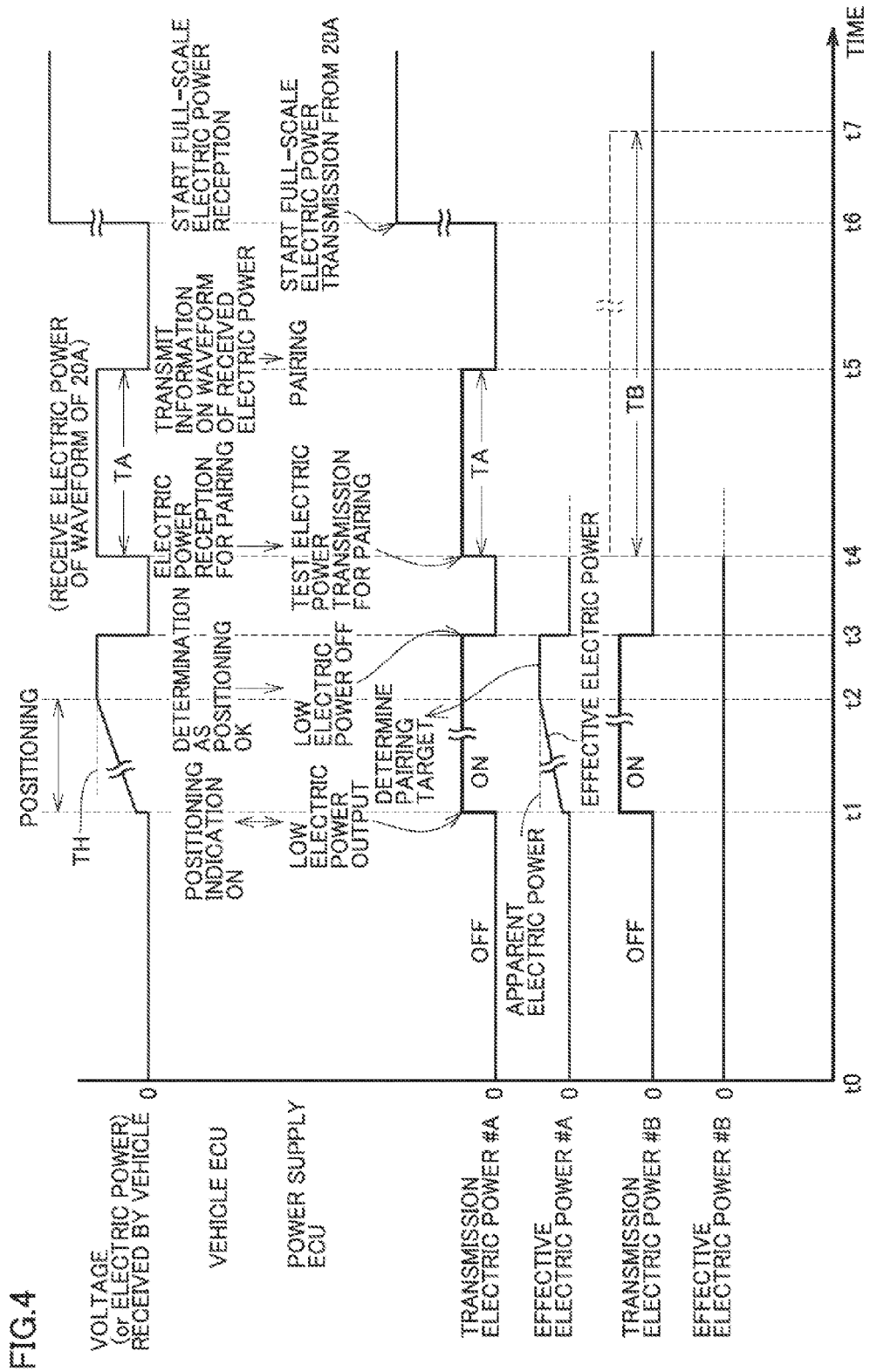
FIG. 4 is a timing chart representing variation in transmission electric power and a received voltage which are varied during the course of the processing in FIG. 3.

Preferably, as shown with time from t4 to t7 in FIG. 4, the electric power transmission control unit (power supply ECU 800) performs pairing processing upon reception of the first signal. As the pairing processing, power supply ECU 800 has the electric power transmission portion which is the subject of electric power transmission carry out electric power transmission which is set with a duration being differed in each of the plurality of electric power transmission portions 700A and 700B. Vehicle 10 transmits a second signal corresponding to the received duration to charging station 90. The electric power transmission control unit (power supply ECU 800) determines based on the second signal, whether or not vehicle 10 has stopped at the electric power transmission portion which is the subject of electric power transmission.

With the configuration above, whether or not determination made based on detection of effective electric power for determining an electric power transmission portion which is a subject of electric power transmission is correct can be checked before full-scale electric power transmission for charging. In addition, pairing processing can end in a short period of time.

Preferably, as shown with time from t4 to t5 in FIG. 5, the electric power transmission control unit (power supply ECU 800) performs pairing processing upon reception of the first signal. As the pairing processing, power supply ECU 800 has the plurality of electric power transmission portions 700A and 700B carry out electric power transmission with the number of times of switching between on and off being differed, vehicle 10 transmits a third signal corresponding to the received number of times of switching to charging station 90, and the electric power transmission control unit (power supply ECU 800) determines based on the third signal, whether or not vehicle 10 has stopped at the electric power transmission portion which is the subject of electric power transmission.

With the configuration above as well, whether or not determination made based on detection of effective electric power for determining an electric power transmission portion which is a subject of electric power transmission is correct can be checked before full-scale electric power transmission for charging.

Details of each feature in the non-contact electric power transmission system will now further be described.

(Detailed Configuration of Non-Contact Electric Power Transmission System)

Referring to FIG. 1, the non-contact electric power transmission system in the present embodiment is constituted of vehicle 10 on which an electric power reception device 120 configured to be able to receive electric power in a non-contact manner is mounted and charging station 90 including electric power transmission devices 20A and 20B transmitting electric power from the outside of the vehicle to an electric power reception portion 100.

Vehicle 10 includes electric power reception device 120, a power storage device 300, a motive power generation apparatus 400, a communication portion 510, a vehicle ECU 500, and a display portion 520. Electric power reception device 120 includes electric power reception portion 100, a filter circuit 150, and a rectification portion 200.

Charging station 90 includes an external power supply 900, electric power transmission devices 20A and 20B, a communication portion 810, and power supply ECU 800. Electric power transmission devices 20A and 20B include power supply portions 600A and 600B, filter circuits 610A and 610B, and electric power transmission portions 700A and 700B, respectively.

For example, as shown in FIG. 2, electric power transmission devices 20A and 20B are provided on or in the ground at parking positions A and B, respectively, and electric power reception device 120 is arranged in a lower portion of a vehicle body. A location of arrangement of electric power reception device 120 is not limited as such. For example, when electric power transmission devices 20A and 20B are provided above or lateral to vehicle 10, electric power reception device 120 may be provided in an upper portion of the vehicle body or in a peripheral surface (a front surface, a rear surface, and a side surface) of the vehicle body.

Electric power reception portion 100 includes a secondary coil for receiving in a non-contact manner, (AC) electric power output from any of electric power transmission portions 700A and 700B of electric power transmission devices 20A and 20B. Electric power reception portion 100 outputs received electric power to rectification portion 200. Rectification portion 200 rectifies AC power received by electric power reception portion 100 and outputs the AC power to power storage device 300. Filter circuit 150 is provided between electric power reception portion 100 and rectification portion 200 and suppresses harmonic noise generated during electric power reception from any of electric power transmission portions 700A and 700B. Filter circuit 150 is formed, for example, from an LC filter including an inductor and a capacitor.

Power storage device 300 is a rechargeable DC power supply and it is implemented, for example, by such a secondary battery as a lithium ion battery or a nickel metal hydride battery. A voltage of power storage device 300 is, for example, around 200 V. Power storage device 300 stores not only electric power output form rectification portion 200 but also electric power generated by motive power generation apparatus 400. Then, power storage device 300 supplies the stored electric power to motive power generation apparatus 400. A large-capacity capacitor can also be adopted as power storage device 300. Though not particularly illustrated, a DC-DC converter regulating an output voltage from rectification portion 200 may be provided between rectification portion 200 and power storage device 300.

Motive power generation apparatus 400 generates driving force for running of vehicle 10 by using electric power stored in power storage device 300. Though not particularly illustrated, motive power generation apparatus 400 includes, for example, an inverter receiving electric power from power storage device 300, a motor driven by the inverter, and drive wheels driven by the motor. Motive power generation apparatus 400 may include a generator for charging power storage device 300 and an engine which can drive the generator.

Vehicle ECU 500 includes a central processing unit (CPU), a storage device, and an input/output buffer (none of which is shown), receives input of signals from various sensors and outputs control signals to each device, and controls each device in vehicle 10. By way of example, vehicle ECU 500 controls running of vehicle 10 and charging of power storage device 300. Such control is not limited to processing by software and processing with dedicated hardware (electronic circuitry) can also be performed.

A relay 210 is provided between rectification portion 200 and power storage device 300. Relay 210 is turned on by vehicle ECU 500 during charging of power storage device 300 by electric power transmission devices 20A and 20B. A system main relay (SMR) 310 is provided between power storage device 300 and motive power generation apparatus 400. SMR 310 is turned on by vehicle ECU 500 when start-up of motive power generation apparatus 400 is requested.

A relay 202 is provided between rectification portion 200 and relay 210. A voltage VR across opposing ends of a resistor 201 connected in series with relay 202 is detected by a voltage sensor 203, and sent to vehicle ECU 500.

Vehicle ECU 500 communicates with communication portion 810 of charging station 90 through communication portion 510 during charging of power storage device 300 by electric power transmission devices 20A and 20B, and exchanges with power supply ECU 800, information on start/stop of charging or an electric power reception condition of vehicle 10.

Referring to FIGS. 1 and 2, vehicle 10 or charging station 90 determines whether or not the secondary coil within electric power reception device 120 is in positioning with a primary coil within electric power transmission device 20A based on a not-shown car-mounted camera or on intensity of received electric power during test electric power transmission (transmission of weak electric power) by electric power transmission portion 700A, and a user is notified of a result through display portion 520. The user moves vehicle 10 such that positional relation between electric power reception device 120 and electric power transmission device 20A is good for electric power transmission and reception based on information obtained from display portion 520. The user does not necessarily have to operate a steering wheel or an accelerator, and vehicle 10 may automatically move for positioning while the user monitors such an operation on display portion 520.

In test electric power transmission with weak electric power, output to such an extent as being used in what is called a specified low power radio station (equal to or lower than 1/100 of full-scale electric power transmission used for charging) is preferred.

Referring again to FIG. 1, power supply portions 600A and 600B receive electric power from external power supply 900 such as a commercial system power supply and generate AC power having a prescribed transmission frequency.

Electric power transmission portions 700A and 700B each include a primary coil for non-contact electric power transmission to electric power reception portion 100. Electric power transmission portions 700A and 700B each receive AC power having a transmission frequency from power supply portions 600A and 600B and transmits electric power to electric power reception portion 100 of vehicle 10 in a non-contact manner through electromagnetic field generated around electric power transmission portions 700A and 700B.

Filter circuits 610A and 610B are provided between power supply portions 600A and 600B and electric power transmission portions 700A and 700B, respectively, and suppress harmonic noise generated from power supply portions 600A and 600B. Filter circuits 610A and 610B are each formed from an LC filter including an inductor and a capacitor.

Electric power transmission device 20A includes detection portion 601A detecting effective electric power. Detection portion 601A includes a current sensor 602A and a voltage sensor 603A. Electric power transmission device 20B includes detection portion 601B detecting effective electric power. Detection portion 601B includes a current sensor 602B and a voltage sensor 601B. Effective electric power in electric power transmission devices 20A and 20B is calculated from a phase difference of a current and a voltage detected by detection portions 601A and 601B.

Detection portion 601A may be provided between filter circuit 610A and electric power transmission portion 700A and detection portion 601B may be provided between filter circuit 610B and electric power transmission portion 700B.

Power supply ECU 800 includes a CPU, a storage device, and an input/output buffer (none of which is shown), receives input of signals from various sensors and outputs control signals to each device, and controls each device in charging station 90. By way of example, power supply ECU 800 controls switching of power supply portions 600A and 600B such that power supply portions 600A and 600B generate AC power having a transmission frequency. Such control is not limited to processing by software and processing with dedicated hardware (electronic circuitry) can also be performed.

Power supply ECU 800 communicates with communication portion 510 of vehicle 10 through communication portion 810 during electric power transmission to vehicle 10, and exchanges with vehicle 10, information on start/stop of charging or an electric power reception condition of vehicle 10.

AC power having a prescribed transmission frequency is supplied from power supply portions 600A and 600B to electric power transmission portions 700A and 700B through filter circuits 610A and 610B. Each of electric power transmission portions 700A and 700B and electric power reception portion 100 of vehicle 10 includes a coil and a capacitor, and is designed to resonate at the transmission frequency. A Q value representing resonance intensity of electric power transmission portions 700A and 700B and electric power reception portion 100 is preferably 100 or higher.

When AC power is supplied from power supply portions 600A and 600B to electric power transmission portions 700A and 700B through filter circuits 610A and 610B, energy (electric power) is transferred from any of electric power transmission portions 700A and 700B to electric power reception portion 100 through electromagnetic field formed between the primary coil included in any of electric power transmission portions 700A and 700B and the secondary coil of electric power reception portion 100. Then, energy (electric power) transferred to electric power reception portion 100 is supplied to power storage device 300 through filter circuit 150 and rectification portion 200.

Though not particularly illustrated, in electric power transmission devices 20A and 20B, an insulating transformer may be provided between electric power transmission portions 700A and 700B and power supply portions 600A and 600B (for example, between electric power transmission portions 700A and 700B and filter circuits 610A and 610B). In vehicle 10 as well, an insulating transformer may be provided between electric power reception portion 100 and rectification portion 200 (for example, between electric power reception portion 100 and filter circuit 150).

(Procedure of Non-Contact Electric Power Transmission)

Figure 3:
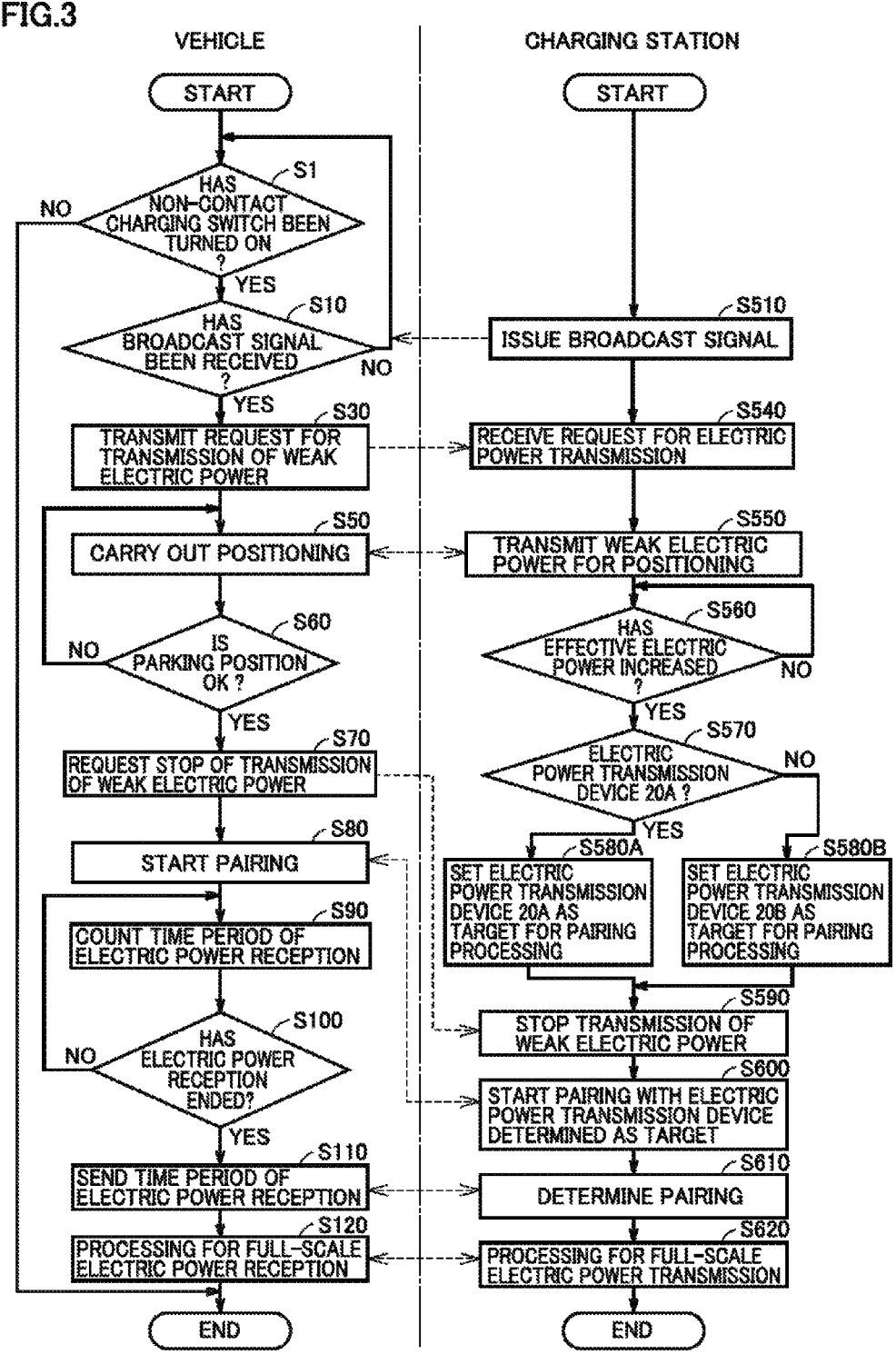
FIG. 3 is a flowchart for illustrating overview of processing performed by a vehicle 10 and a charging station 90 in non-contact electric power transmission.

FIG. 3 is a flowchart for illustrating overview of processing performed by vehicle 10 and charging station 90 in non-contact electric power transmission. FIG. 4 is a timing chart representing variation in transmission electric power and a received voltage which are varied during the course of the processing in FIG. 3.

Referring to FIGS. 1, 3, and 4, in the vehicle, whether or not a non-contact charging switch designating whether or not to carry out non-contact charging is ON is determined in step S1. Though not particularly limited, preferably, the non-contact charging switch has automatically been set to ON while the vehicle is started up and the vehicle is configured such that the user can switch setting to OFF.

In step S510, power supply ECU 800 of charging station 90 broadcasts a signal notifying that a situation allows charging when there is an empty parking position.

When vehicle ECU 500 of vehicle 10 receives this signal in step S10, the process proceeds to step S30, and vehicle ECU 500 transmits a request for transmission of weak electric power to charging station 90.

In step S540, power supply ECU 800 of charging station 90 receives the request for electric power transmission.

When charging station 90 receives in step S540 the request for electric power transmission from the vehicle, in response thereto, in charging station 90, electric power transmission devices 20A and 20B transmit in step S550, weak electric power for positioning with electric power reception device 120.

In step S50, vehicle 10 carries out positioning through automatic or manual movement of vehicle 10 (see a time point t1 in FIG. 4). During positioning, vehicle ECU 500 renders relay 202 conductive and obtains magnitude of received voltage VR which is produced across the opposing ends of resistor 201 and detected by voltage sensor 203. Since this voltage is lower than a voltage in full-scale electric power transmission, vehicle ECU 500 sets relay 210 to off so as not to be affected by power storage device 300 during detection.

Charging station 90 monitors in step S560, whether or not effective electric power has increased in each of electric power transmission devices 20A and 20B while it carries out electric power transmission in step S550. Monitoring is carried out by effective electric power detection portion 601A of electric power transmission device 20A constituted of current sensor 602A and voltage sensor 603A and effective electric power detection portion 601B of electric power transmission device 20B constituted of current sensor 602B and voltage sensor 603B. When electric power reception portion 100 starts to receive electric power from electric power transmission portion 700A or 700B, a phase difference of a current and a voltage in the electric power transmission portion which is transmitting electric power to electric power reception portion 100 varies and effective electric power increases.

When increase in effective electric power is detected in step S560, the processing in steps S570 to S580B determines whether a subject of electric power transmission is either electric power transmission device 20A or electric power transmission device 20B.

Effective electric power #A detected in electric power transmission device 20A increases from t1 to t2 in FIG. 4, while effective electric power #B detected in electric power transmission device 20B remains at zero. Therefore, power supply ECU 800 recognizes that the subject of electric power transmission is electric power transmission device 20A.

In the vehicle, during this period, vehicle IECU 500 notifies in step S60 the fact that magnitude of received voltage VR has exceeded a threshold value TH through display portion 520. The user thus recognizes that positioning has been successful. Thereafter, when the user gives a notification that the parking position is OK by pressing a parking switch within vehicle 10, the process proceeds to step S70 (see a time point t2 in FIG. 4).

In step S70, vehicle ECU 500 transmits a request for stopping transmission of weak electric power for positioning to charging station 90. In step S590, power supply ECU 800 of charging station 90 receives the request for stopping transmission of weak electric power, and transmission of weak electric power for positioning by electric power transmission devices 20A and 20B ends (see a time point t3 in FIG. 4).

In step S80 and step S600, vehicle ECU 500 and power supply ECU 800 perform pairing processing for checking whether or not positioning with respect to any of electric power transmission devices 20A and 20B has reliably been achieved.

As shown with time from t4 to t5 in FIG. 4, when electric power transmission device 20A has been determined as the subject of electric power transmission in steps S570 and S580A, power supply ECU 800 allows test electric power transmission for pairing from electric power transmission portion 700A of electric power transmission device 20A.

In contrast, when electric power transmission device 20B has been determined as the subject of electric power transmission in steps S570 and S580B, power supply ECU 800 allows test electric power transmission for pairing from electric power transmission portion 700B of electric power transmission device 20B.

In test electric power transmission used in the pairing processing, as in positioning, output to such an extent as being used in what is called a specified low power radio station (equal to or lower than 1/100 in full-scale electric power transmission used for charging) is preferred.

In FIG. 4, power supply ECU 800 differs a duration of on of transmission electric power for each electric power transmission device. Namely, in transmission of electric power by electric power transmission device 20A, electric power transmission is carried out with transmission electric power being turned, on for a time period of TA (see a time point t4 in FIG. 4). In transmission of electric power by electric power transmission device 20B, electric power transmission is carried out with transmission electric power being turned on for a time period of TB.

In steps S90 and S100, vehicle ECU 500 counts the duration of on of received electric power, and in step S110, notifies power supply ECU 800 of the counted duration of on. In the example in FIG. 4, electric power reception device 120 receives transmission electric power from electric power transmission device 20A. Vehicle ECU 500 notifies power supply ECU 800 of the fact that the duration of on of received electric power is TA. Power supply ECU 800 can thus reliably confirm positioning with respect to electric power transmission device 20A.

In step S620, charging station 90 performs processing for full-scale electric power transmission from the electric power transmission device which is in positioning and has completed checking that a target has been determined through pairing (see a time point to in FIG. 4). In the example in FIG. 4, electric power transmission device 20A performs processing for electric power transmission. In step S120, vehicle 10 performs processing for full-scale electric power reception by electric power reception device 120 and power storage device 300 is charged with received electric power. Then, when charging of power storage device 300 is completed, processing on the vehicle side and in the charging station ends.

(Modification)

The present invention is not limited to the embodiment above, and for example, a modification as below is also encompassed.

FIG. 5 is a diagram for illustrating a modification of pairing processing. In FIG. 5, power supply ECU 800 differs a cycle of switching between on and off of transmission electric power for each electric power transmission device. Namely, electric power transmission device 20A switches between on and off of transmission electric power every cycle ΔTA and electric power transmission device 20B switches between on and off of transmission electric power every cycle ΔTB (see time points t4 to t5 in FIG. 5).

Vehicle ECU 500 notifies power supply ECU 800 of a cycle of switching between on and off of received electric power. In the example in FIG. 5, electric power reception device 120 receives transmission electric power from electric power transmission device 20A. Vehicle ECU 500 notifies power supply ECU 800 of the fact that the cycle of switching between on and off of received electric power is set to ΔTA. Power supply ECU 800 thus knows that positioning with electric power transmission device 20A has been completed (see a time point t5 in FIG. 5).

In the modification in FIG. 5, pairing is achieved with the use of transmission electric power, however, limitation thereto is not intended. Pairing can be achieved with various techniques, and for example, pairing may be achieved by providing a radio frequency identification (RFID) tag and an RFID reader in a vehicle and an electric power transmission portion, respectively, based on an RFID technique.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A non-contact electric power transmission system, comprising:
   a vehicle; and
   a charging station,
   said charging station including
      a plurality of electric power transmission portions, and
      an electric power transmission control unit controlling electric power transmission from said plurality of electric power transmission portions,
   said charging station broadcasting beacons,
   said vehicle transmitting a request signal after receiving said beacons,
   said electric power transmission control unit having said plurality of electric power transmission portions start transmission of transmission electric power for positioning after reception of said request signal,
   said vehicle transmitting a first signal to said charging station when positioning with respect to an electric power transmission portion is completed,
   said electric power transmission control unit having said plurality of electric power transmission portions carry out electric power transmission which is set with a duration being differed for each of said plurality of electric power transmission portions, after reception of said first signal,
   said vehicle transmitting a second signal corresponding to the received duration to said charging station,
   said electric power transmission control unit determining the transmission portion that said vehicle has stopped, based on said second signal, and
   said electric power transmission control unit having the transmission portion that determined as said vehicle has stopped carry out electric power transmission.

2. A non-contact electric power transmission system comprising:
   a vehicle; and
   a charging station,
   said charging station including
      a plurality of electric power transmission portions, and
      an electric power transmission control unit controlling electric power transmission from said plurality of electric power transmission portions,
   said charging station broadcasting beacons,
   said vehicle transmitting a request signal after receiving said beacons,
   said electric power transmission control unit having said plurality of electric power transmission portions start transmission of transmission electric power or positioning after reception of said request signal,
   said vehicle transmitting a first signal to said charging station when positioning with respect to an electric power transmission portion is completed,
   said electric power transmission control unit having said plurality of electric power transmission portions carry out electric power transmission which is set with the number of times of switching between on and off being differed for each of said plurality of electric power transmission portions, upon reception of said first signal,
   said vehicle transmitting a third signal corresponding to the received number of times of switching to said charging station,
   said electric power transmission control unit determining the transmission portion that said vehicle has stopped, based on said third signal, and
   said electric power transmission control unit having the transmission portion that determined as said vehicle has stopped carry out electric power transmission.

3. A charging station which feeds electric power to a vehicle in a non-contact manner, comprising:
   a plurality of electric power transmission portions; and
   an electric power transmission control unit controlling electric power transmission from said plurality of electric power transmission portions,
   said charging station broadcasting beacons,
   said electric power transmission control unit having said plurality of electric power transmission portions start transmission of transmission electric power for positioning after reception of a request signal from the vehicle,
   said vehicle transmitting a first signal to said charging station when positioning with respect to an electric power transmission portion,
   said electric power transmission control unit having said plurality of electric power transmission portions carry out electric power transmission which is set with a duration being differed for each of said plurality of electric power transmission portions, after reception of said first signal, said vehicle transmitting a second signal corresponding to the received duration to said charging station, said electric power transmission control unit determining the transmission portion that said vehicle has stopped, based on said second signal, and said electric power transmission control unit having the transmission portion that determined as said vehicle has stopped carry out electric power transmission.

4. A charging station which feeds electric power to a vehicle in a non-contact manner, comprising:

a plurality of electric power transmission portions; and an electric power transmission control unit controlling electric power transmission from said plurality of electric power transmission portions, said charging station broadcasting beacons, said electric power transmission control unit having said plurality of electric power transmission portions start transmission of transmission electric power for positioning after reception of a request signal from said vehicle, said vehicle transmitting a first signal to said charging station when positioning with respect to an electric power transmission portion, said electric power transmission control unit having said plurality of electric power transmission portions carry out electric power transmission which is set with the number of times of switching between on and off being differed for each of said plurality of electric power transmission portions, upon reception of said first signal, said vehicle transmitting a third signal corresponding to the received number of times of switching to said charging station, said electric power transmission control unit determining the transmission portion that said vehicle has stopped, based on said third signal, and said electric power transmission control unit having the transmission portion that determined as said vehicle has stopped carry out electric power transmission.

\* \* \* \* \*